United States Patent [19]

Kimura et al.

[11] 4,120,452
[45] Oct. 17, 1978

[54] AUTOMATIC VENDING SYSTEM

[75] Inventors: Atsushi Kimura, Ikeda; Tasuku Ishimoto, Toyonaka, both of Japan

[73] Assignee: Matsushita Electric Industrial Co., Ltd., Japan

[21] Appl. No.: 713,643

[22] Filed: Aug. 12, 1976

[30] Foreign Application Priority Data

Aug. 14, 1975 [JP] Japan .................................. 50-99220
Sep. 25, 1975 [JP] Japan ................................ 50-116193
Sep. 25, 1975 [JP] Japan ................................ 50-116194
Sep. 26, 1975 [JP] Japan ................................ 50-116991
Feb. 10, 1976 [JP] Japan .................................. 51-13430

[51] Int. Cl.² ........................ G07F 7/08; G06K 19/06
[52] U.S. Cl. ...................................... 235/381; 235/487
[58] Field of Search ..................... 235/61.7 R, 61.7 B, 235/381, 380; 349/149 A, 152; 340/149 A, 152

[56] References Cited

U.S. PATENT DOCUMENTS

Re. 28,701  1/1976  Edwards et al. ................. 235/61.7 B
3,906,460   9/1975  Halpern ........................... 235/61.8 A
3,931,497   1/1976  Gentile et al. .................. 235/61.7 B
3,971,916   7/1976  Moreno ............................ 235/61.7 B
4,020,325   4/1977  Pfost et al. ..................... 235/61.7 B
4,020,326   4/1977  Coulthurst ...................... 235/61.7 B

*Primary Examiner*—Daryl W. Cook
*Attorney, Agent, or Firm*—Burgess, Ryan and Wayne

[57] ABSTRACT

A vending system is disclosed which is adapted to be installed in a hotel or the like for permitting the guests to buy articles in a refrigerator or vending machine in a guest room without use of coins. When a guest inserts his memory holder into a vending machine and selects an article, an article code or codes representative of the article or articles he bought are transferred from a transmitter in the vending machine into the memory holder, and an accounting machine reads out the data in the memory holder to prepare a bill. Optical, magnetic or high frequency data transmission is used between the vending machine and the memory holder and between the memory holder and the accounting machine so that no data transmission line is required.

5 Claims, 18 Drawing Figures

FIG. 1
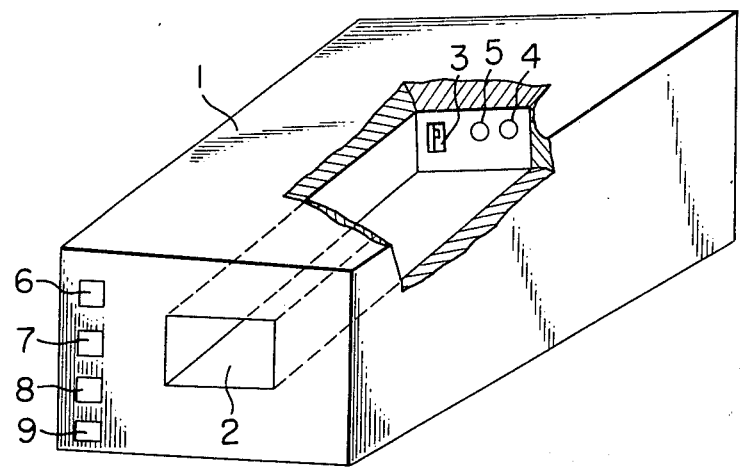
FIG. 3
(a) ARTICLE CODE INPUT (SALES)
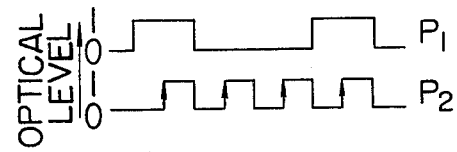
(b) DATA READING FROM MEMORY HOLDER
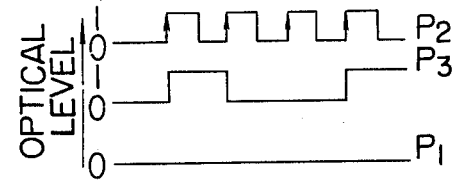

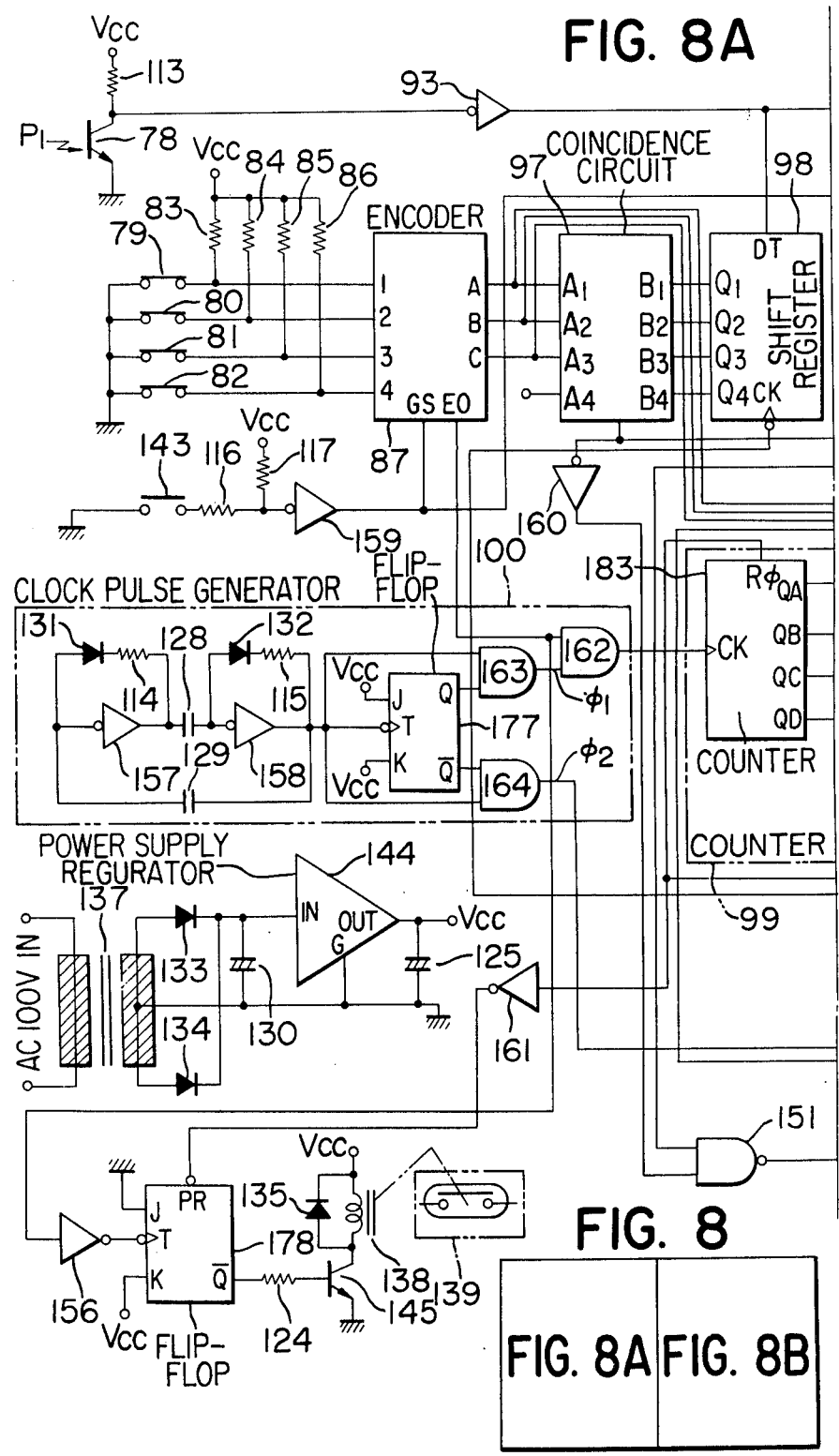

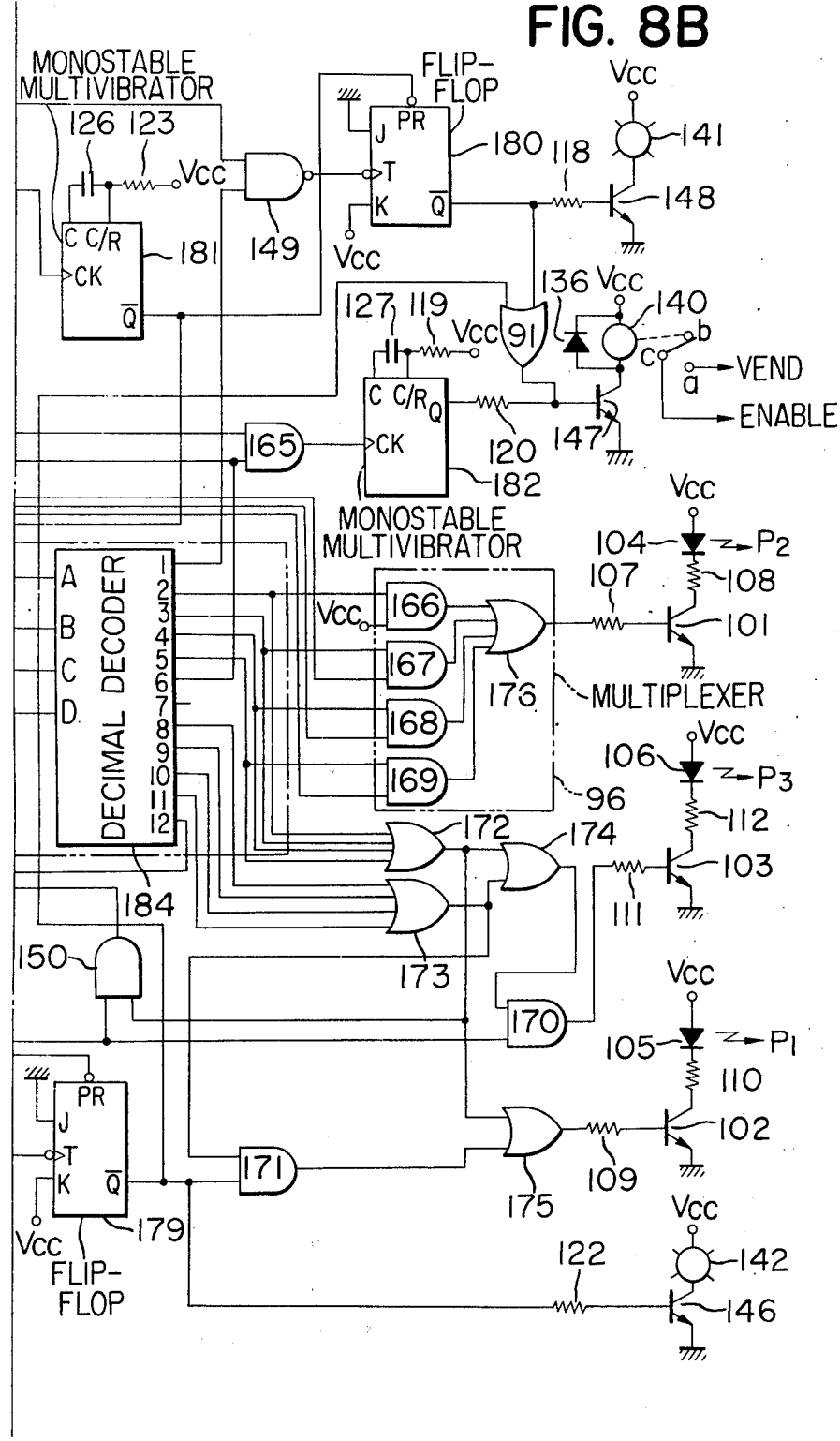

AUTOMATIC VENDING SYSTEM

BACKGROUND OF THE INVENTION

The present invention relates to a vending system in a hotel or the like which permits a guest to buy an article from a vending machine such as a refrigerator installed in his room without the use of coins.

In hotels or the like, when a guest checks out a hotel employee checks a refrigerator in the guest's room to find out the articles sold to the guest during his stay so that this sales system is economical from a standpoint of savings in labor. To overcome this problem, vending machines are installed in some hotels, but this sales system is inconvenient to guests because they must carry coins with them and must frequently ask for change in small coins.

To overcome these problems, there has been invented and demonstrated a sales or vending system in which a data transmission line is established to connect refrigerators or vending machines installed in guest rooms and other places with an accounting machine or the like in a front desk so that every time an article is sold, the signal representative of the article sold may be transmitted to the accounting machine. However this system has the defect that it cannot be readily installed in the existing hotels or the like because of the wiring problem of the data transmission lines.

SUMMARY OF THE INVENTION

In view of the above, one of the objects of the present invention is to provide a vending system for use in a hotel or the like capable of automatically processing the data about the articles and their quantities that a guest has bought from a refrigerator or vending machine during his stay.

Another object of the present invention is to provide a vending system which can eliminate the data transmission lines between the guest rooms and the accounting machine or the like so that the vending system may be readily installed in existing hotels or the like at relatively low cost.

A further object of the present invention is to provide a vending system for permitting a guest to buy an article from a vending machine without the use of coins by the simple operation of a key holder which includes a memory.

To the above and other ends, the present invention provides a vending system comprising a plurality of vending machines each provided with a transmitter for generating an article code representative of the article sold, a plurality of memory holders each for enabling the vending machine upon insertion therein and for holding the article codes of the articles sold, an accounting machine for reading the article codes from the memory holder so as to calculate the sum of the articles sold and prepare a bill, and an optical, magnetic or high frequency data transmission link between the vending machine and the memory holder and between the memory holder and the accounting machine.

BRIEF DESCRIPTION OF THE DRAWINGS

FIG. 1 is a perspective view of a data coupling unit according to a preferred embodiment of the invention;

FIG. 3, including a and b, is a view used for the explanation of the data transmission link between a memory holder and the transmitter and between the memory holder and an accounting machine;

FIG. 8, including 8a and 8b, is a detailed block diagram thereof;

DESCRIPTION OF THE PREFERRED EMBODIMENTS

Figure 2:
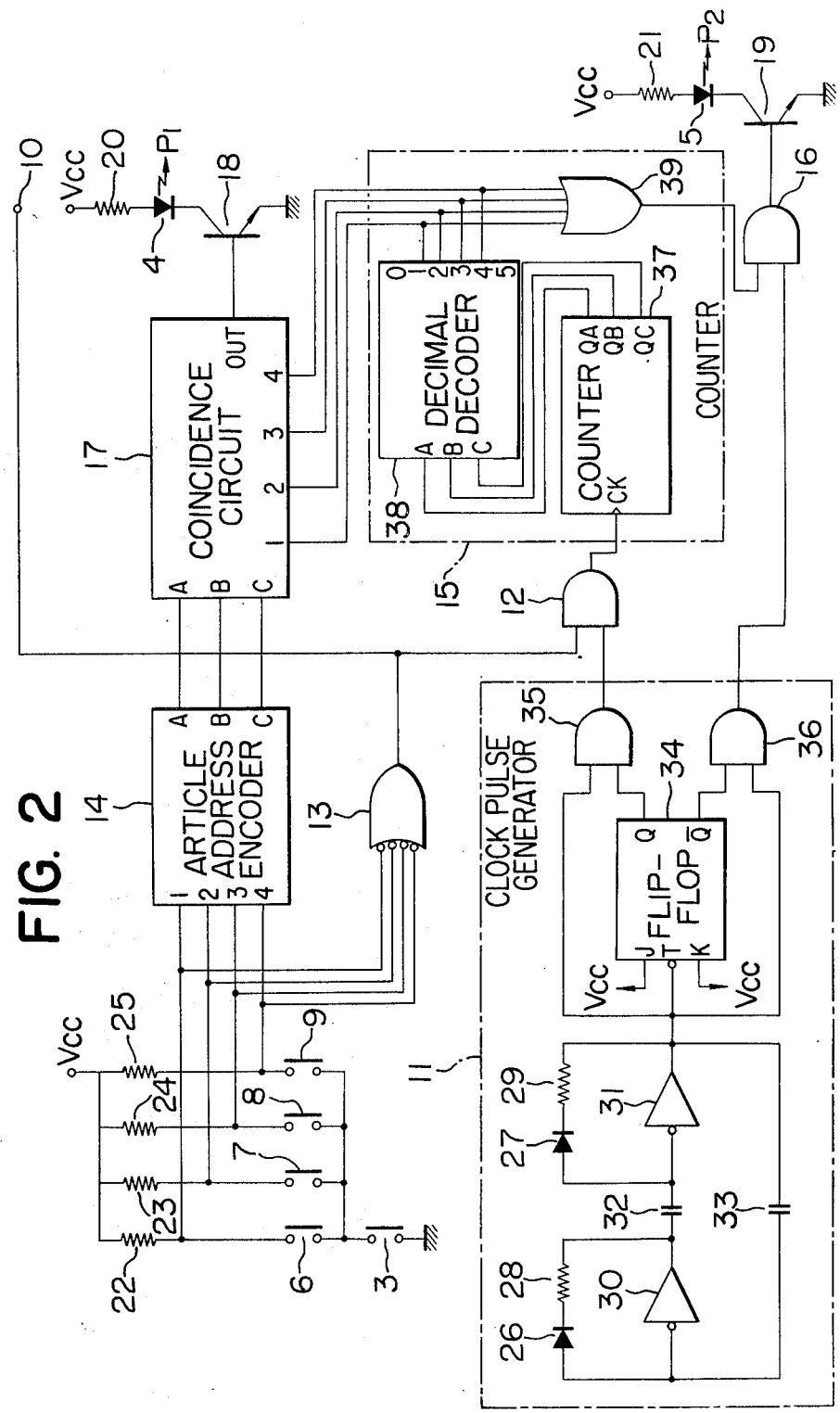
FIG. 2 is a circuit diagram thereof.

In FIG. 1 there is shown a data coupling unit 1 mounted in a refrigerator in a guest room in a hotel. The unit 1 has a memory holder insertion hole 2, and a microswitch 3 is placed at the bottom of the insertion hole 2 for detecting the insertion of a memory holder. Placed at the bottom of the insertion hole 2 are light emitting diodes 4 and 5 for transferring infrared ray signals (to be referred to as "optical signals" hereinafter) representative of a code of an article and optical clock pulses in synchronism with the optical article code signal into the memory holder inserted into the insertion hole 2. A plurality of pushbuttons 6, 7, 8 and 9 are mounted on the front panel of the unit 1 for the selection of an article.

FIG. 2 shows a block diagram of an electrical circuit of the unit 1. In FIG. 2, the reference numerals 3 through 9 designate the microswitch, light emitting diodes 4 and 5 and pushbuttons 6 through 9 described with reference to FIG. 1. Reference numeral 10 denotes a vending permission or sales enable signal terminal; 11, a clock pulse generator; 12, an AND gate; 13, an OR gate for giving the positive logic output in response to a negative logic input; 14, an article address encoder; 15, a counter; 16, an AND gate; 17, a coincidence circuit; 18 and 19, NPN transistors; and 20 and 21, resistors. The pushbuttons 6 through 9 are connected through resistors 22, 23, 24 and 25, respectively, to a power supply Vcc.

The clock pulse generator 11 consists of diodes 26 and 27, resistors 28 and 29, inverters 30 and 31, capacitors 32 and 33, a flip-flop 34 and coin input AND gates 35 and 36.

The counter 15 consists of a counter 37, a decimal decoder 38 and a main input OR gate 39. The counter 37 has a clock pulse input terminal CK and output terminals QA, QB and QC, and the decoder 38 has three input terminals A, B and C connected to the output terminals of the counter 37 and output terminals 0 through 5.

Next the mode of operation of the unit 1 will be described. Upon insertion of a memory holder, the switch 3 is closed. When a guest pushes the switch 6 to select an article, the output "1" is derived from the OR gate 13 and transmitted to the terminal 10 as the electrical signal to be transmitted to a vending mechanism (not shown) to permit access to a desired article. The electrical signal generated by pushing the switch 6 is also transmitted to the input terminal 1 of the encoder 14 to be encoded into a BCD code representing an article code in this embodiment. Alternatively, a read-only memory may be connected to the output of the encoder 14 for generating a code of a selected article. The output from the OR gate 13 is applied to one of the input terminals of the AND gate 12 so that the counter 15 is actuated. The output from the counter 15 is applied to the coincidence circuit 17 so that the article code is scanned bit by bit and converted into the serial data to be applied to the transistor 18. The transistor 18 is turned on and off in response to the article code so that the optical signal $P_1$ representative of the serial data of the article code is derived from the emitter diode 5. FIG. 3, (a) shows the relation between the optical output signal $P_1$ and the clock pulse $P_2$ when the article code is 1001.

Figure 4:
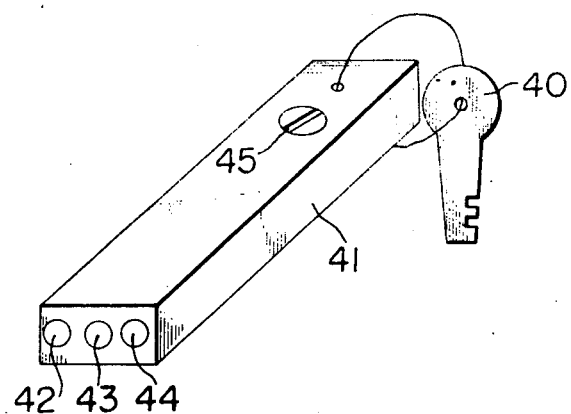
FIG. 4 is a perspective view of a key holder incorporating the memory holder.

FIG. 4 shows a key holder 41 with a key 40 and a memory including phototransistors 42 and 43, an infrared light emitting diode 44 and a dry cell 45.

Figure 5:
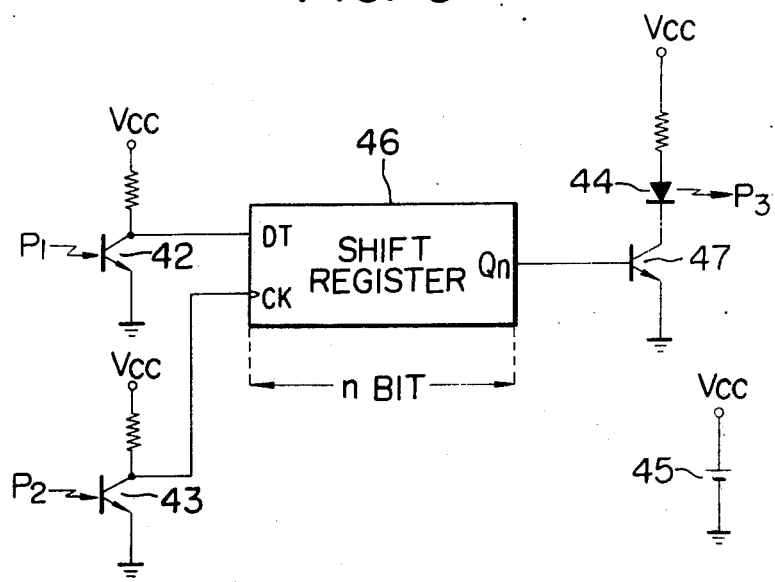
FIG. 5 is a circuit diagram of the memory holder.

FIG. 5 shows a circuit diagram of the memory further including an n-bit shift register 46 and an NPN transistor 47. The phototransistors 42 and 43 are so arranged as to intercept the optical signal $P_1$ and optical pulses $P_2$ emitted from the light emitting diodes 4 and 5 when the key holder 41 is inserted into the memory holder insertion hole 2 of the oscillator 1. The collector of the phototransistor 42 is connected to a data input terminal DT of the shift register 46 while the collector of the phototransistor 43, to a clock pulse terminal CK. Therefore upon reception of the optical signal $P_1$ and the optical clock pulses $P_2$, they are stored in the shift register 46 as serial data. Therefore the number of articles vendable by use of the memory holder 41 equals a quotient obtained by dividing n-bits of the shift register 46 by the number of bits of each article code.

In case of check-out, the data stored in the memory holder 41 must be read out at a front desk. For this purpose, installed at the front desk is a reader of an accounting machine capable of checking the articles bought by a guest and their numbers. When n-bits optical pulses are applied to the phototransistor 43 of the memory holder 41 from the reader or register, the optical output $P_3$ is derived from the memory holder 41 and is read by the reader so that the sold articles and their numbers may be correctly processed. FIG. 3(b) shows the optical output $P_3$ read out from the memory holder 41. A dry cell or the like is incorporated in the memory holder 41, and in order to minimize the power consumption, the shift register 24 may be made of CMOS devices. In this embodiment the optical signals are used for transfer of the data from the transmitter 1 to the memory holder 41 and from the memory holder 41 to the reader, but it will be understood that magnetic or high-frequency signals may be used instead of the optical signal.

Next another embodiment of the present invention will be described which may check whether or not the sales data are correctly transferred into the memory holder 41 and which may suspend or disable the sales operation of an automatic vending machine when no vacant address is available in the memory holder.

Figure 6:
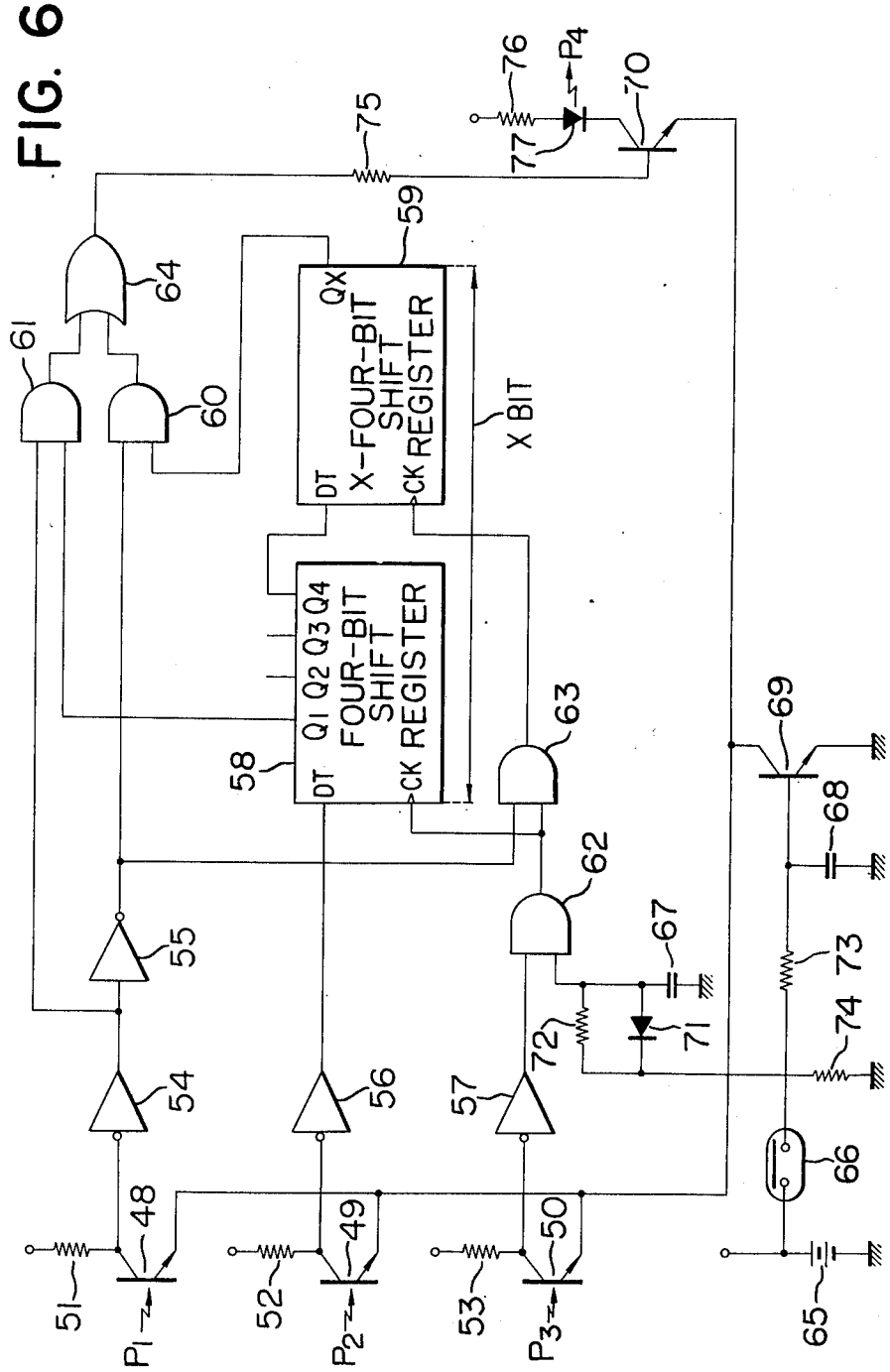
FIG. 6 is a circuit diagram of a memory holder used in a second embodiment of the present invention.

FIG. 6 shows the circuit diagram of the memory holder used in the second embodiment. $P_1$, $P_2$, $P_3$ and $P_4$ are optical signals; 48, 49 and 50, phototransistors; 51, 52 and 53, resistors; 54, 55, 56 and 57, inverters; 58, a four-bit shift register; 59, an X-four-bit shift register; 60, 61, 62 and 63, AND gates; 64, an OR gate; 65, a battery; 66, a read switch; 67 and 68, capacitors; 69 and 70, transistors; 71, a diode; 72 through 76, resistors; and 77, a photodiode.

Figure 7:
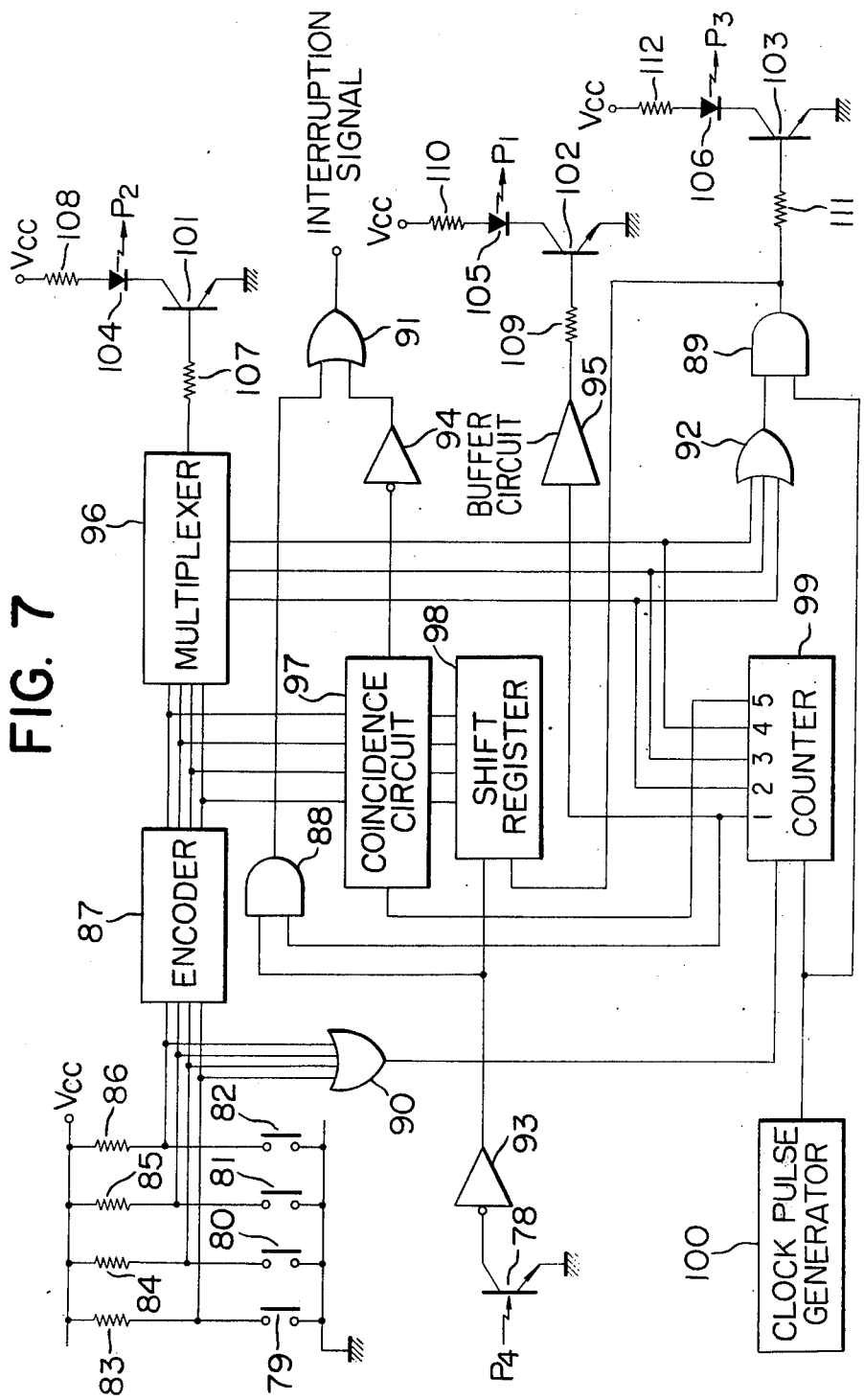
FIG. 7 is a circuit diagram of a transmitter used in the second embodiment.

FIG. 7 shows the circuit diagram of the unit of the second embodiment. $P_1$ through $P_4$, optical signals corresponding to those shown in FIG. 6; 78, a phototransistor; 79, 80, 81 and 82, pushbuttons for selecting an article; 87, an encoder; 88 and 89, AND gates; 90, 91 and 92, OR gates; 93 and 94, inverters; 95, a buffer circuit; 96, a multiplexer; 97, a coincidence circuit; 98, a shift register; 99, a counter; 100, a clock pulse generator; 101, 102 and 103, transistors; 104, 105 and 106, light emitting diodes; and 107 through 112, resistors. The detail of this circuit is shown in FIG. 8, where same reference numerals are used to designate parts similar to those shown in FIG. 7. In FIG. 8, 113 through 124, resistors; 125 through 130, capacitors; 131 through 136, diodes; 137, a center-tapped transformer; 138, an electromagnet; 139, a reed switch mounted on the memory holder; 140, a relay; 141 and 142, display lamps; 143, a switch actuable in response to the insertion of a memory holder; 144, a power supply regulator; 145 through 148, transistors; 149 through 155, two-input NAND gates; 156 through 161, inverters; 162 through 171, AND gates; 172 through 176, OR gates; 177 through 180, flip-flops, T denoting a trigger pulse input terminal, J and K, input data terminals, Q and $\bar{Q}$, output terminals and PR, a preset terminal; 181 and 182, monostable multivibrators; 183, a counter, K denoting a clock pulse terminal R$\phi$, a reset and terminal QA through QD, output terminals; 184, a decimal decoder for converting a binary coded signal into a decimal code, A, B, C and D denoting binary coded signal input terminals and 1 through 12, output terminals.

Next the mode of operation of the second embodiment will be described. When a guest pushes the pushbutton switch 79, 80, 81 or 82, the signal is generated and encoded into a binary coded signal by the encoder 87 so that the signal representative of an article to be sold may be derived. The switches 79 through 82 are connected to the OR gate 90, and in response to the output signal from the OR gate 90, the counter 99 is actuated. In response to the output from the first output terminal 1 of the counter 99 transmitted through the buffer circuit 95, the transistor 102 conducts so that the light emitting diode 105 is turned on. The optical signal $P_1$ from the diode 105 is intercepted by the phototransistor 48 shown in FIG. 6 so that the latter is turned on. The output from the transistor 48 is transmitted through the inverter 54 to the AND gate 61 so that the logic in the final stage in the shift register 58 is applied to the OR gate 64. When the output from the final stage in the shift register 12 is "1", the transistor 70 is turned on in response to the output from the logical sum circuit 64 so that the light emitting diode 77 is turned on. The optical signal $P_4$ from the diode 77 is intercepted by the phototransistor 78 and in response to the output from the latter transmitted through the inverter 93, the output from the logical product circuit 88 changes to "1". The output derived from the logical sum circuit 91 is "1" which is applied to a control unit of a mechanism for permitting the access to an article. That is, the in response to the first count 1 of the counter 99, the shift register 58 shown in FIG. 6 checks the overflow of the shift register. When the first bit of the article codes is always "1" the overflow check may be facilitated. At counts 2, 3 and 4, the data which represent the article and are stored in the multiplexer 92 are converted into the serial data. That is, the optical signal $P_2$ is intercepted by the phototransistor 49 of the memory holder as the optical data representing the article code. The time band at counts 2, 3 and 4 is detected by the logical sum circuit 92, and in the phase in which the clocks from the clock generator 100 are synchronized with the said article data, the light emitting diode 106 is turned on through the logical product circuit 89 and the transistor 102. On the side of the memory holder, when the optical data $P_2$ representative of the article and the optical clocks $P_3$ are received, the data are stored into the shift register 58. In this case the phototransistor 48 remains turned off so that the gate of the logical product circuit 60 is opened so that the optical signal $P_4$ has the same waveform with that of the optical signal $P_2$ and are received by the phototransistor 78. Then the signal is transferred through the inverter 93 into the shift register 98; that is, the article data are stored in the register 98. At count 5, the coincidence circuit 97 is actuated so that when the transmitted article code coincides with the returned article code, the input of the inverter 94 becomes "1" so that no sales interruption or disable signal is derived from the logical sum circuit 91. Thus the guest may have access to his desired article.

To read out the data from the memory holder, the optical signal $P_1$ is set to "1", and X clocks are given to the optical signal $P_3$. Then the article data are derived serially from the optical signal $P_4$. When this optical signal $P_4$ is received and processed, sales information; that is, the articles and their numbers sold may be detected.

Next a third embodiment of the present invention will be described which is capable of checking whether or not the transfer of the signal to the memory holder is correctly effected and checking whether or not the data stored in the memory holder are overflowing so that whether the sales operation of an automatic vending machine may be continued or interrupted.

Figure 9:
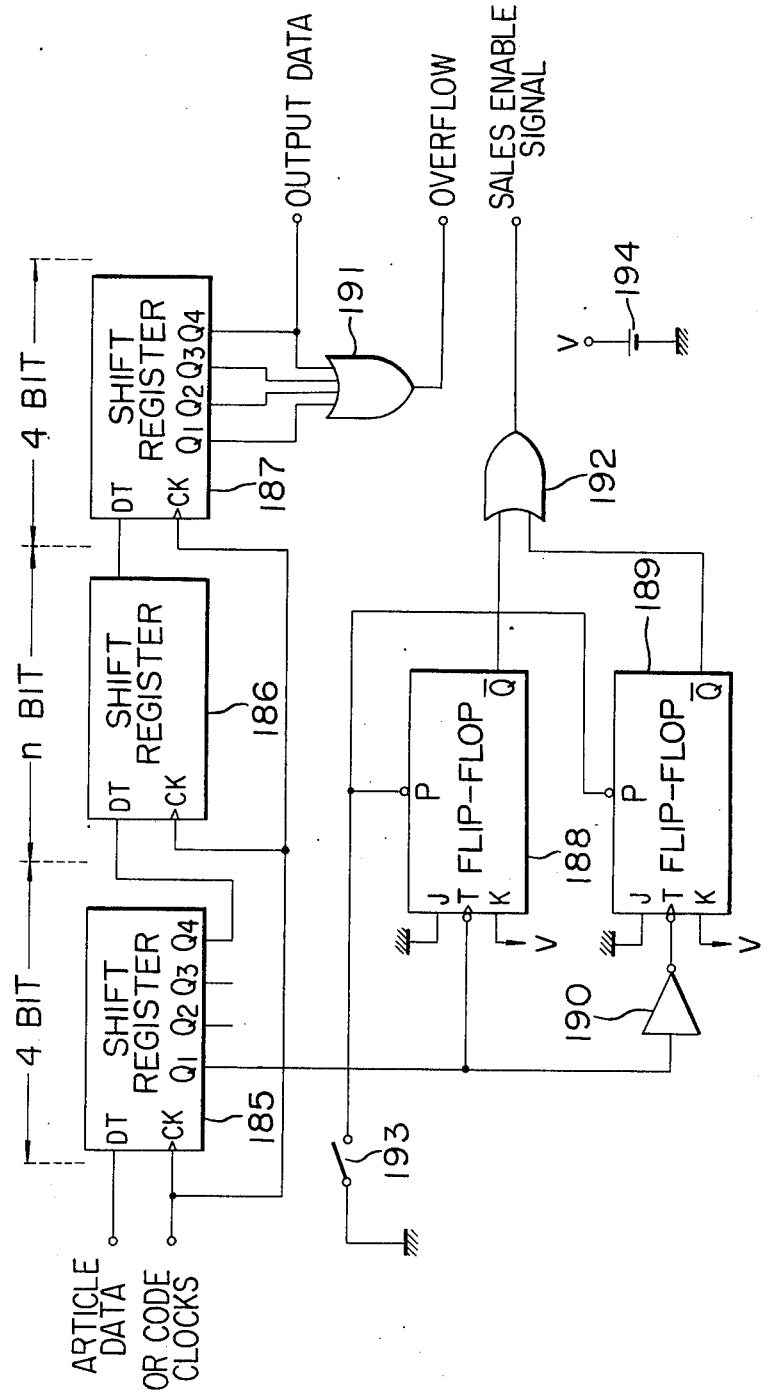
FIG. 9 is a circuit diagram of a memory holder used in a third embodiment of the present invention.

FIG. 9 shows a circuit diagram of a memory holder used in the third embodiment, and 185, 186 and 187 are shift registers each with a number of stages shown; 188 and 189, flip-flops; 190, an inverter; 191 and 192, logical sum circuits; 193, a reset switch and 194, a power supply or battery.

Next the mode of operation will be described.

Whenever the four-bit article data and the clocks in synchronism with the article data are received from a refrigerator in response to each sales operation, four-bits are held in the shift register 185. In the second sales operation, the four-bits received in response to the first sales operation are transferred into the shift register 186 so that new article data are stored in the shift register 185. In this step, every bit passes $Q_1$ of the shift register 185. Therefore when the article codes do not include the codes consisting of four "1" or "0" bits in succession, there must be the change from "1" to "0" or from "0" to "1" during the time when four bits are passing. The fact that no change occurs means the interruption of the transmission of data or clocks. The flip-flop 188 is trigged in response to the change from "1" to "0" so that $\overline{Q}$ becomes "1". The flip-flop 189 is triggered in response to the change from "0" to "1" by the inverter 190. The logical sum is obtained in the logical sum circuit 192 so that the vending permission signal may be derived. The switch 193 resets this signal.

Since the stages of the shift registers 185, 186 and 187 are limited, an overflow may occur. Therefore the sum of $Q_1$ through $Q_4$ of the four-bit shift register which is most close to the final stage is obtained in the logical sum circuit 191 to produce the overflow signal. The refrigerator receives this signal to control whether access to an article is permitted or inhibited. In reading the output data may be derived from the shift register 187 by giving clocks consisting of $(4 + n + 4)$.

In this embodiment the input and output terminals are of the contact type, but a contactless signal transmission using photoelectric, high-frequency or magnetic switches may be employed as needs demand.

In this embodiment, instead of using coins the memory element is embedded in the key holder which is inserted into a vending machine. When an article selection button is depressed, sales information is stored in the memory element in the key holder and at the same time access to the selected article is provided for a buyer or guest. When he checks out, he pays for what he bought at the front desk; that is, his memory holder is inserted into an accounting machine so that sales information may be automatically read out to prepare a bill. However unless his room number is printed or otherwise on the bill, the bill is less persuasive to him. Therefore a fourth embodiment of the present invention will be described which may input a room number in an efficient manner. First, key holders are prepared for respective rooms. Therefore it is clear that a room number may be put into a key holder as an input and it may be automatically read out. However when a room number is put into a key holder as a read-only memory, key holders have no interchangeability so that some troubles will result. Therefore in the present invention a memory element of the type in which the stored information is destroyed when read out is used. That is, in case of checkout the room number is read out and then the same room number is written into the key holder. When it is desired to change the room number, the accounting machine or the like is switched to the register mode so that a desired key number is written into the key holder by means of ten keys or the like. According to this system, the number of inputs may be minimized and, the manual input in case of checkout may be eliminated so that considerable savings in labor may be attained.

Figure 10:
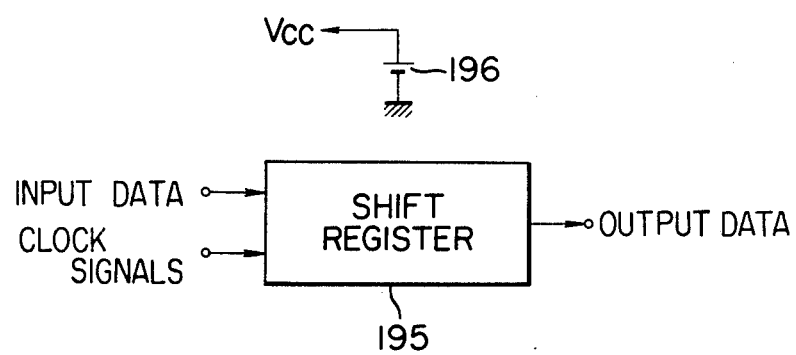
FIG. 10 is a circuit diagram of a memory holder used in a fourth embodiment of the present invention.

The fourth embodiment of the present invention will be described. In FIG. 10 there is shown a block diagram of a memory holder, and 195 is a shift register made of CMOS and embedded into the key holder and 196 is a battery for maintaining the information stored in the shift register 195.

Figure 11:
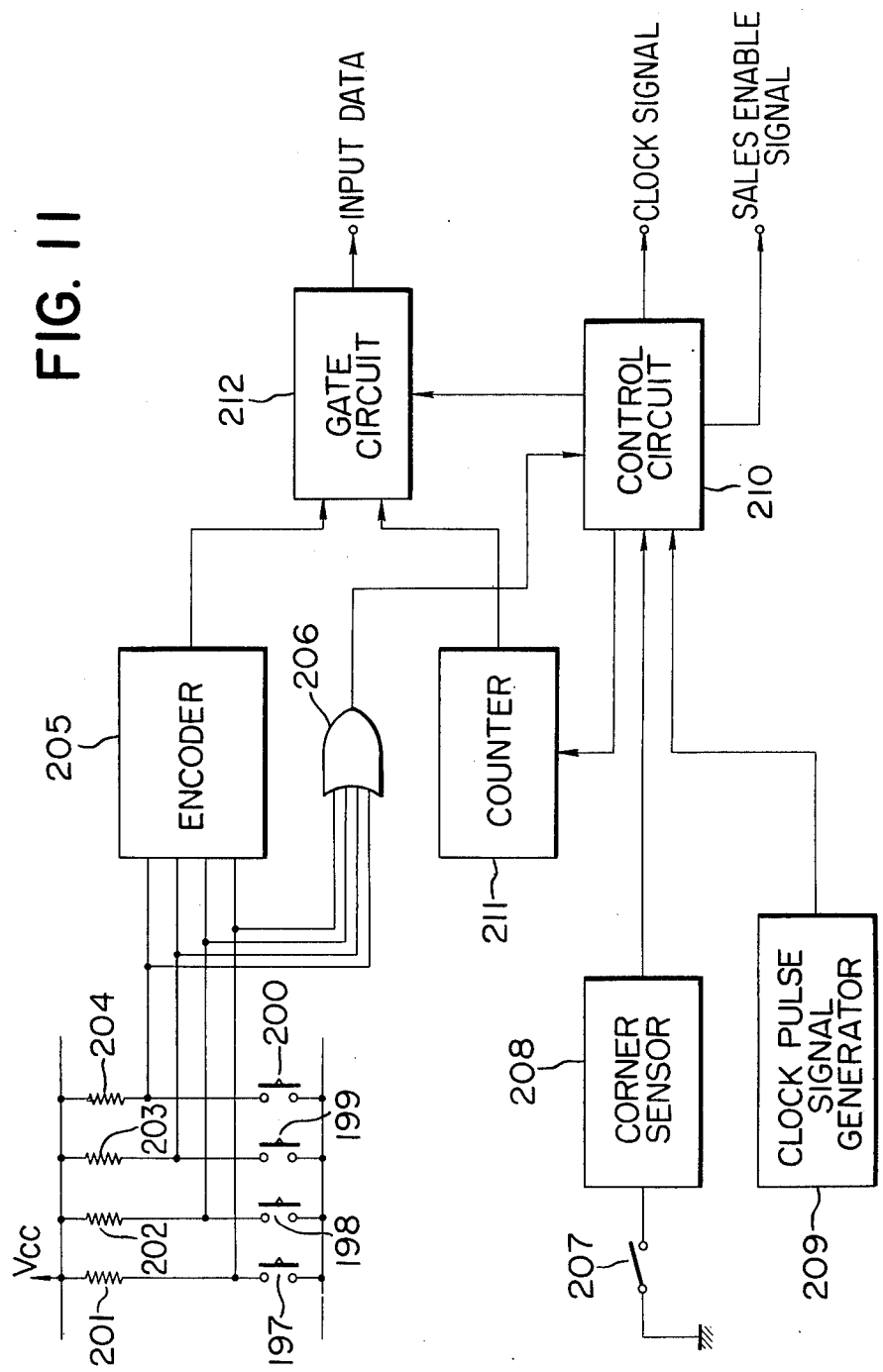
FIG. 11 is a circuit diagram of a transmitter used in the fourth embodiment.

FIG. 11 is a circuit diagram of an article code generator mounted in a vending machine, and 197, 198, 199 and 200 are pushbutton switches for selecting a desired article; 201, 202, 203 and 204, resistors; 205, an encoder, 206, a logical sum circuit; 207, a switch; 208, a corner sensor for detecting a key holder inserted into a vending machine; 209, a clock pulse or signal generator; 210, a control circuit; 211, a counter; 212, a gate circuit. The circuits 209 through 212 are for transferring data into a key holder. When the key holder is inserted into the vending machine, input data as well as clock signals are transmitted at contacts in FIGS. 10 and 11.

Figure 12:
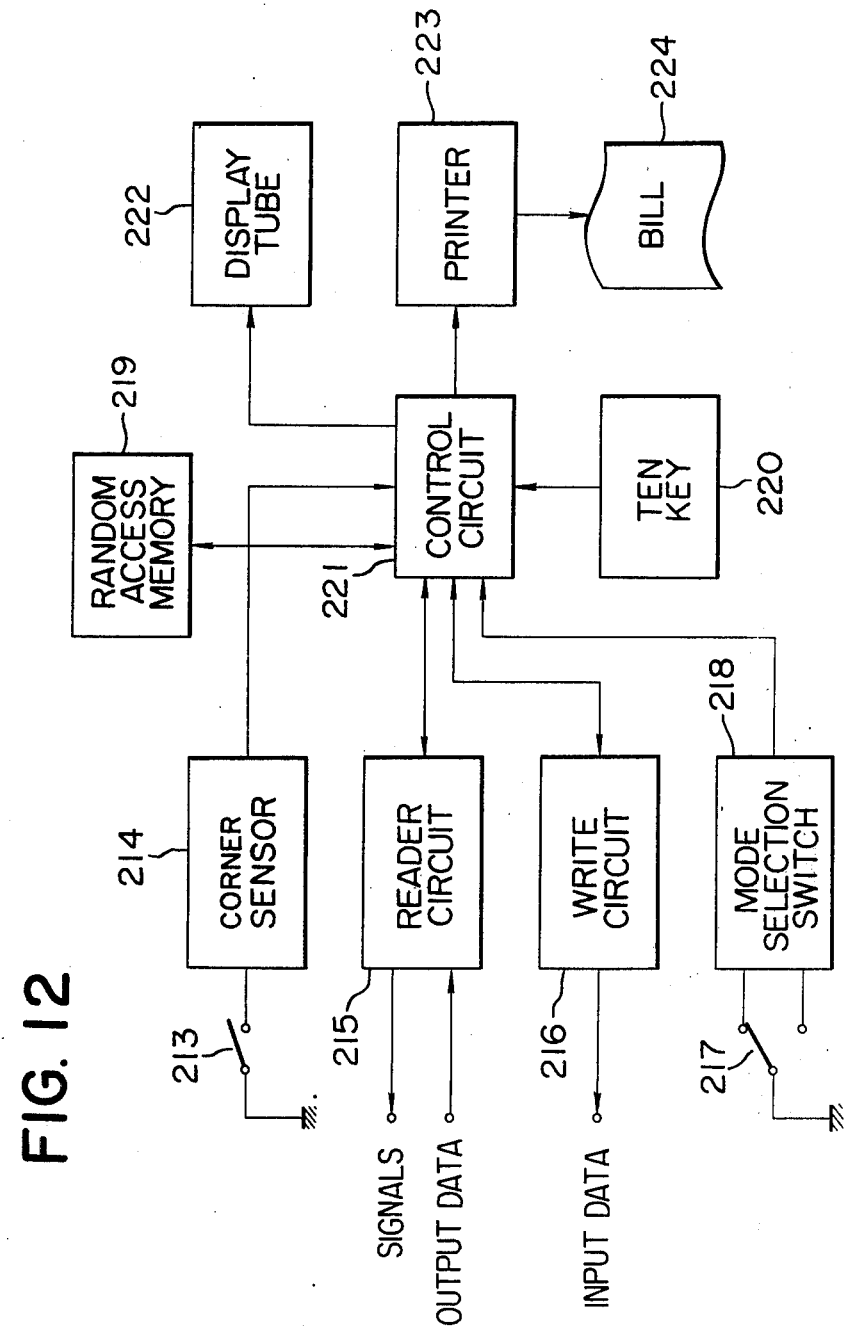
FIG. 12 is a block diagram of an accounting machine used in the fourth embodiment.

FIG. 12 shows a block diagram of an accounting machine, and 213 is a switch; 214, a corner sensor; 215, a reader circuit; 216, a write circuit; 217, a changeover switch; 218, a mode selection switch for selecting either the normal accounting or registration mode; 219, a random access memory; 220, a ten key keyboard for writing a room number; 221, a control circuit; 222, a display tube; 223, a printer; and 224, a bill.

Next the mode of operation will be described.

(1) Sales

Figure 13:
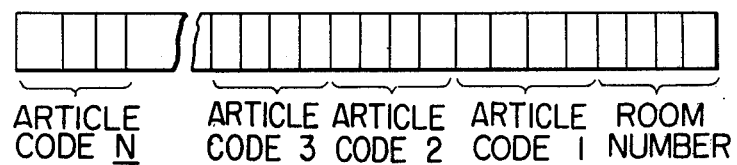
FIG. 13 shows article codes stored in the memory holder.

Upon insertion of the key holder into the vending machine, it is detected by the switch 207 and the sensor 208 when one of the article selection buttons 197 through 200 is depressed, the signal is converted into a binary code by the encoder. The output from the encoder 205 is used as an article code in the fourth embodiment. Next the counter 211 starts counting as the control circuit 210 detects through the logical sum circuit 206 the switch 197, 198, 199 or 200 depressed. The article code is converted into a serial data by the gate circuit 212 so that the article code is derived bit by bit. At the same time, the output or clock signals in synchronism with the input data are derived from the control circuit 210 so that data may be transferred into the shift register 195 shown in FIG. 10. Upon completion of transfer of data for one article, the sales permission signal is generated to permit a buyer access to an article he wants. The shift register 195 shown in FIG. 10 receives both the input data and clock signals to store them bit by bit. As shown in FIG. 13, the room number is stored at the head of the data stored, and the article codes each representing the article sold in each sales operation follow.

(2) Accounting

When the key holder is inserted into the accounting machine, the insertion of the key holder is detected by the switch 213 and the sensor 214, and the detection signal is applied to the control circuit 221 so that the read circuit 215 generates the clock signals and receives the output data to convert it into a serial data which is in turn transferred bit by bit into the random access memory 219. Thereafter the printer 223 issues the bill 224 according to a predetermined program, and the data may be displayed on the display tube 222. At this moment all data in the shift register 195 are erased. Only the room number is transferred from the random access memory 219 by the control circuit 221, and the input data are transferred from the wirte circuit 216 into the shift register 195 while the clock signals are generated in synchronism with the input data. Thus the room number is stored again in the shift register in the key holder.

(3) Registration

The changeover switch 217 is shifted to the registration mode to use the switchover circuit 218. Next a desired room number is entered by the ten-key keyboard 220 so that the control circuit 221 transfers the input data into the shift register 195.

With the vending machine of the type described, articles may be sold without the use of coins, and the room number is printed on the bill handed over to the guest for payment or liquidation. Therefore the invention has an advantage in that the room number input operation is not required.

Next the fifth embodiment of the present invention will be described which is capable of vending articles when, instead of a memory holder a credit card or the like is inserted into a vending machine. In the fifth embodiment, a credit card is inserted into a vending machine, and sales information is recorded on the credit card or the like after a customer has depressed an article selection button and received an article. In this case, there occurs a trouble or malfunction that after sales operation; that is after an article has been discharged, sales information cannot be recorded on a credit card. Since the article has already been discharged, it is missing. To overcome this problem, a vending machine may be so designed that only after sales information has been recorded on a credit card, an article is discharged, but there occurs again a problem that even though the sales information has been recorded the article is not discharged.

Figure 14:
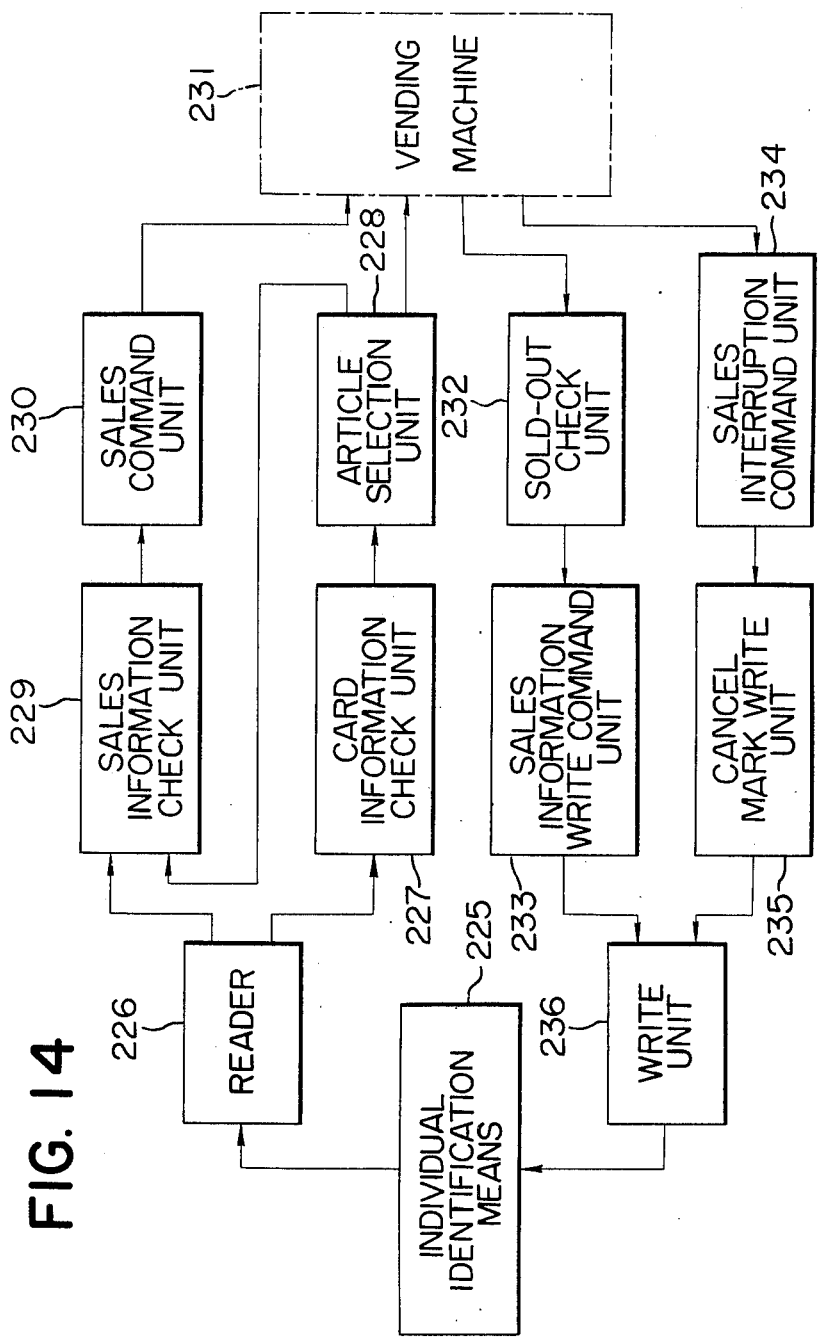
FIG. 14 is a block diagram of a fifth embodiment of the present invention wherein a credit card is used instead of the memory holder.

The present invention was made to overcome these problems. In FIG. 14, there is shown a block diagram of the fifth embodiment of the present invention. 225 is an individual identification means such as a credit card; 26, a reader for reading the identification means 225; 227, a card information check unit; 228, an article selection unit; 229, sales information check unit; 230, sales command unit; 231, a vending machine; 232, a sold-out check unit; 233, sales information write command unit; 234, sales interruption or diable command unit; 235, a cancel mark write unit; and 236, a write unit, the arrows indicating the direction of transmission of signals.

Next the mode of operation of the fifth embodiment will be described. When the card 225 is inserted into the vending machine in order to buy an article, the reader 226 reads the content or information recorded on the card 225 and the article selection buttons in the article selection unit 228 become operable when the card information check unit 227 has detected that the information on the card 225 is correct. When one of the article selection buttons is selected, the sold-out check unit 232 checks whether or not the article selected has been sold out. When the selected article is available or not sold out, the sales information write command unit 233 generates write command for writing an article code on the card 225 so that the write unit 236 is actuated to write sales information upon the card 225. Sales information recorded on the card 225 is checked by the sales information check unit 229, and when the sales information has been detected as being correctly recorded, the sales command unit 230 gives sales command to the vending machine 231. When the salesimpossible or disable sales command is not returned from the sales interruption unit 234 in the vending machine 231 within a predetermined time after the sales command was generated, sales operation is completed. If the sales interruption signal is received from the sales interruption command unit 234 within a predetermined time, the cancel mark write command unit 235 is actuated to write on the card 225 a mark representative of the cancellation of sales information and an abnormal or warning lamp (not shown) of the vending machine 231 is turned on.

A circuit for generating sales interruption signal may be arranged in a simple manner as will be described below. A microswitch or photoelectric element is positioned in a passage from an article storage to an article discharge opening so that it may be actuated by an article discharged through the passage. When the article discharge detection switch described above is actuated within a predetermined time after the sales command signal was generated, it is detected that the sale is consummated. On the other hand when the article discharge detection switch is not actuated within a predetermined time, it is detected that the sale is impossible and the sales interruption signal is generated.

With the control system of the type described, false or unauthorized cards as well as malfunctions of the reader unit and a writting circuit and the sold-out condition can be detected prior to the generation of sales command so that the discharge of an article may be interrupted in a simple manner and no sales information may be recorded on the card. Furthermore when the failure of article discharge occurs after sales information has been recorded on the card, the cancel mark is recorded on the card so that sales information recorded on the card and the article sold always coincide with each other and there occurs no problem due to soldout articles.

Instead of the cards, the memory holders of the types described above may be also used in the fifth embodiment.

The advantage of the present invention may be summarized as follows:

(1) No coin is used.

(2) No data transmission line is requred between each vending machine and a front desk or data processing unit.

(3) It is possible to prevent the overflow of a memory holder.

(4) Error in data transmission between a vending machine and a memory holder may be eliminated.

(5) A memory holder may be made compact in size and inexpensive to fabricate.

As described above, the present invention is very useful because no data transmission is required to be installed between each vending machine and an accounting room where data are collected and processed so that the coinless vending machine system is very convenient to guests. Furthermore there is provided a system for detecting whether or sales information is correctly transferred into the memory as well as for detecting the overflow of the memory so that sales may be continued or interrupted.

What is claimed is:

1. An automatic vending system for use in a hotel or the like, comprising:
a plurality of vending machines each of which stores a plurality of articles to be sold and is enabled to sell an article by selection means, each of said machines including a transmitter capable of generating a serial article code representative of an article selected by said selection means and clock means;
a portable individual identification means for sequentially serially holding the article codes generated in response to the operation of said selection means for selecting a desired article after said identification means has been inserted into the vending machine;
an accounting meachine for reading the article codes from said identification means so as to calculate the sum of the prices of the articles sold for liquidation by a holder of said identification means;
the transmission of the signals between the vending machine and the identification means being made by wireless coupling means;
a selected article being sold in response to a sale signal, and means for generating said sale signal only when the article code recorded in the identification means coincides with the article code generated by said transmitter after the article code generated by said selection means has been stored in said identification means.

2. An automatic vending system for use in a hotel or the like, comprising:
a plurality of vending machines each provided with a transmitter for generating an article code representative of an article to be sold, a main memory comprising a shift register for receiving coded digital signals corresponding to sales information for each sales operation, x-bits of each coded signal comprising one block of information, a logic circuit for generating a first control signal for enabling said vending machine when the x-bits stored closest to the first stage of said shift register changes when said sales information is entered therein, and a logic circuit for generating a second control signal for disabling said vending machine when the x-bits stored closest to the last stage of said shift register changes;
a plurality of memory holders, each holder being capable of enabling each of said vending machines to place the corresponding machine in a sales mode upon insertion of said memory holder into said vending machine, each memory holder storing the code of the article purchased via the corresponding vending machine;
each of said vending machines including a transmitter for generating a serial digital article code, clock means, and means for enabling said vending machine to discharge an article upon insertion of the memory holder therein;
said memory holder including a shift register for storing the article codes, the data stored in said shift register being read out by applying wireless control signals to a clock input element of said memory holder, said memory holder including a battery power supply therefor;
an accounting machine for reading the article codes from each of said memory holders and for calculating the sum of the prices for the articles sold via each memory holder, and for preparing a bill for said sum; and
signal transmission means for transferring signals between each vending machine and a corresponding memory holder inserted therein, and for transferring signals between the accounting machine and each memory holder inserted therein.

3. An automatic vending machine for use in a hotel or the like, comprising:
a plurality of vending machines each provided with a transmitter for generating an article code representative of an article to be sold, said transmitter generating a digital sales information code in response to an article selection signal, said vending machine having a comparison circuit for comparing the sales information code generated thereby with a sales information code transmitted thereto, and for generating an error signal when said codes do not correspond to each other;
a plurality of memory holders, each holder being capable of enabling each of said vending machines to place the corresponding machine in a sales mode upon its insertion of said memory holder therein, each memory holder having a main register for storing a digital code corresponding to an article via said vending machine, said main register comprising a shift register having an input side and a last stage side;
means for transferring said sales information code in the form of a serial digital data signal into said memory holder, said memory holder including a changeover circuit for selecting either the input side or the last stage side of said shift register, in response to a changeover signal;

means for transmitting a signal corresponding to the content of said shift register, to said transmitter of said vending machine;

said comparision circuit comparing said sales information code signals when said input side of said memory holder shift register is selected, and said vending machine including means for detecting the overflow of said shift register of said memory holder when said last stage side thereof is selected, said memory holder also including a battery power supply therefor;

an accounting machine for reading the article codes from each of said memory holders and for calculating the sum of the prices of articles corresponding thereto, and for preparing a bill for said sum; and signal transmission means for transferring signals between each vending machine and a corresponding memory holder inserted therein, and for transferring signals between the accounting machine and each memory holder inserted therein.

4. An automatic vending machine for use in a hotel or the like, comprising:

a plurality of vending machines each provided with a transmitter for generating an article code representative of an article to be sold;

a plurality of memory holders each for enabling each of said vending machines to place said machine into a sales mode upon insertion of said memory holder therein, and for storing sales information identifying the article purchased, each memory holder also including means for storing an identification number in the memory holder and means for erasing said sales information and said identification number when the same are read out;

means for re-writing said identification number in said memory holer after said number has been read out;

means for storing a new desired identification number in said memory holder in response to a registration mode signal;

an accounting machine for reading the article codes from each of said memory holders, for calculating the sum of the prices of the corresponding articles and preparing a bill; and signal tranmission means for transferring signals between each vending machine and a memory holder inserted therein, and for transferring signals between the accounting machine and a memory holder inserted therein.

5. An automatic vending system for use in a hotel or the like, comprising:

a plurality of vending machines each provided with a transmitter for generating an article code representative of an article to be sold;

a plurality of memory holders, each memory holder being capable of enabling each of said vending machines to place said vending machine into a sales mode upon insertion of said memory holder into said vending machine, each memory holder including means for storing sales information including the code of the article to be purchased;

each vending machine including means for determining that said sales information has been correctly stored in said memory holder, means for discharging an article from said machine in response to said determination, and means for storing a cancel mark in said memory holder when it is not possible to discharge the article;

an accounting machine for reaching the article codes from each of said memory holders, calculating the sum of the prices of the articles corresponding thereto, and preparing a bill; and signal transmission means for transferring signals between each vending machine and the memory holder inserted therein, and for transferring signals between the accounting machine and the memory holder inserted therein.

* * * * *

UNITED STATES PATENT AND TRADEMARK OFFICE
CERTIFICATE OF CORRECTION

PATENT NO. : 4,120,452
DATED : October 17, 1978
INVENTOR(S) : Atsushi Kimura, et al It is certified that error appears in the above—identified patent and that said Letters Patent is hereby corrected as shown below:

Column 7, line 46: "wirte" should be --write--.

Column 8, line 45: "salesimpossible" should be --sales-impossible--.

Column 9, line 3: "writting" should be --writing--.

line 55: "meachine" should be --machine--

Signed and Sealed this

Eighteenth Day of March 1980

[SEAL]

Attest:

SIDNEY A. DIAMOND

Attesting Officer      Commissioner of Patents and Trademarks